Figure 1:
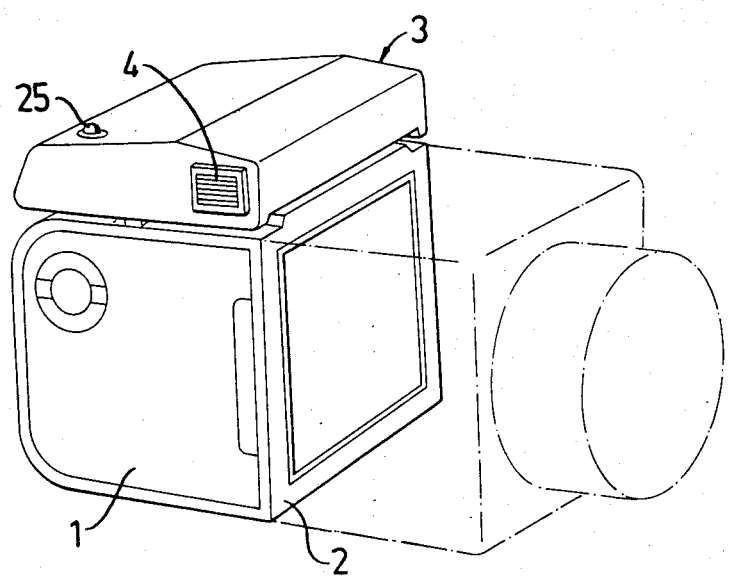

United States Patent [19]

Lundberg et al.

[11] Patent Number: 4,493,543
[45] Date of Patent: Jan. 15, 1985

[54] DEVICE FOR DATA RECORDING AT PHOTOGRAPHIC CAMERAS

[75] Inventors: Jan A. Lundberg, Torslanda; Göran T. L. Wallgren, Onsala; Mats H. Martinsson, Gothenburg, all of Sweden

[73] Assignee: Victor Hasselblad Aktiebolag, Gothenburg, Sweden

[21] Appl. No.: 472,278

[22] Filed: Mar. 4, 1983

[30] Foreign Application Priority Data

Apr. 14, 1982 [SE] Sweden ................................ 8202342

[51] Int. Cl.³ ............................................. G03B 17/24
[52] U.S. Cl. ..................................................... 354/109
[58] Field of Search ................................. 354/106, 109

[56] References Cited

U.S. PATENT DOCUMENTS

| | | | |
|---|---|---|---|
| 3,953,868 | 4/1976 | Kawamura et al. | 354/109 |
| 4,165,933 | 8/1979 | Sunouchi et al. | 354/106 |
| 4,268,143 | 5/1981 | Dearing et al. | 354/106 |
| 4,269,495 | 5/1981 | Dearing | 354/106 |

*Primary Examiner*—Michael L. Gellner
*Attorney, Agent, or Firm*—Sherman & Shalloway

[57] ABSTRACT

The invention relates to a device for data recording at photographic cameras equipped with a separate film magazine. The device according to the invention is characterized in that it is designed as a separate unit (3), which can be attached detachably on the film magazine (1), and which comprises a microprocessor (8) for controlling predetermined information and a necessary power source (9) as well as optical means (5,13) for information transfer to the emulsion side of the film (1) while the film is being advanced.

3 Claims, 7 Drawing Figures

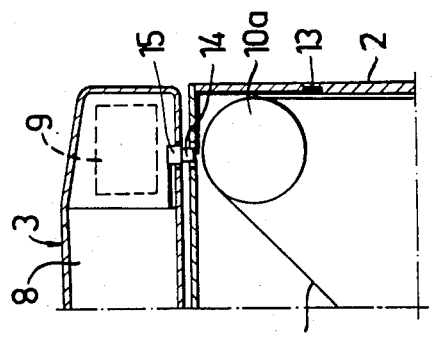
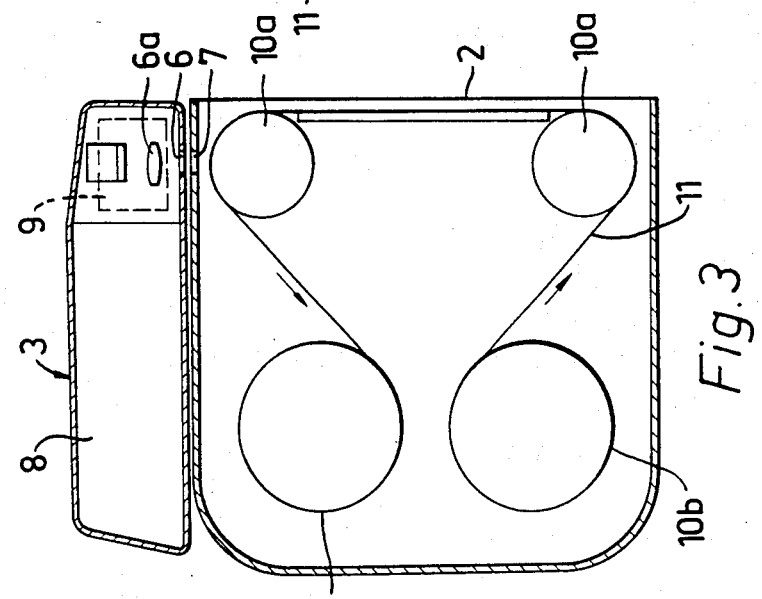
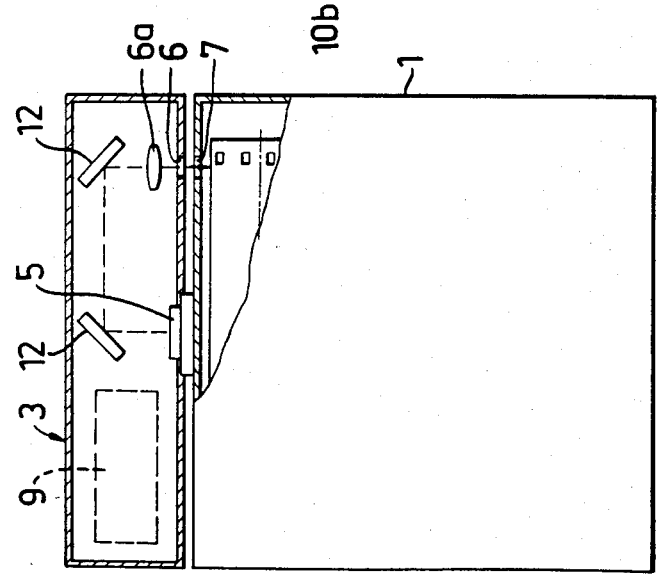

DEVICE FOR DATA RECORDING AT PHOTOGRAPHIC CAMERAS

The present invention relates to photographic cameras equipped with exchangeable film magazines and refers to a device for recording data on the film in connection with the exposure of the film.

In several fields of photography where long series of similar photographs are taken, it is absolutely necessary to be able subsequently to unconfusably identify individual photographs. Such photographs are taken, for example, at aerial map plotting, at aerial surveillance of sea districts and at the photographing of patients in hospitals. The data to be recorded may include, for example, information on date, clock time, position, patient number etc., which when the system is completely developed requires many characters. Several devices for data inputting at cameras with exchangeable film magazines are known already. U.S. Pat. No. 4,268,143 discloses such a device, which proceeds from a standard film magazine for the camera in question and where the optical part of the recording device consists of character transmitter, mirrors and lens, which are built-in in an empty space in the spool holder of the magazine. A film guide roller, further, is turned out so as to provide space for the ray path all the way to the film. The electronic system and power source associated with the device are designed as separate units and connected to the film magazine by cable.

The device described shows several disadvantages. The remodelling of a standard magazine is extensive and must be carried out in a special workshop. The adjusting of the mirrors into the ray path requires a very high precision. The turning out of the guide roller can jeopardize the capability of maintaining the film plane. The characters reflected-in are projected against the back of the film, which implies, that the light must pass through the film base and antihalation, before it arrives at the light-sensitive emulsion side of the film, which in its turn results unavoidably in blur. A separate battery and electronic unit renders the device uncomfortable to use. Other known devices of this kind also shows the aforesaid disadvantages in a varying degree. All of the devices with character generation in the film magazine project the characters against the back of the film.

The present invention has the object to provide a device for data recording which is designed as a complete unit and with a minimum of interference can be connected to a standard film magazine for the camera in question. A second object is to project characters to be recorded against the emulsion side of the film, which implies maximum definition, because light losses in the film base are avoided. A third object is to render information transfer possible while the film is being advanced. A fourth object is to arrange the optical means so that data recording can be effected at the edge of the film either in the film movement direction or across the same or, when a maximum character amount is to be recorded, both along and across the film movement direction.

These objects can be achieved by the present invention, in that it has been given the characterizing features defined in the claims.

According to the invention, the aforesaid objects are achieved in that the device is designed as a separate unit, which can be attached detachably on the film magazine, which device comprises all electronic and optical components and a power source. The electronically generated characters are projected in the film magazine, and the projected image meets the emulsion side of the film. The battery compartment of the device renders it possible to connect a cable for the input of data taken from outside, for example position information received from the electronic navigation equipment of an airplane.

Figure 7:
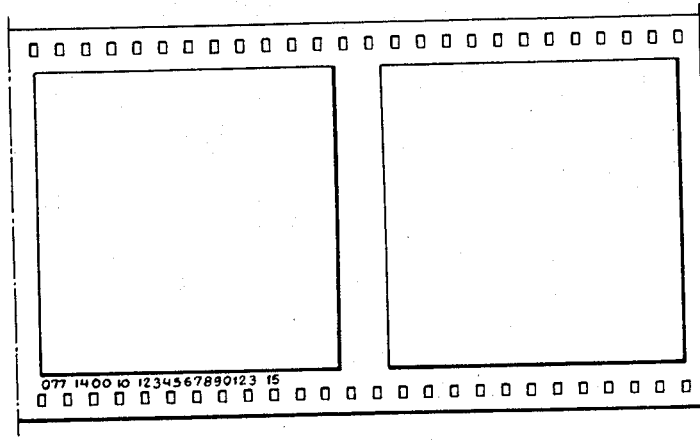
Figure 5:
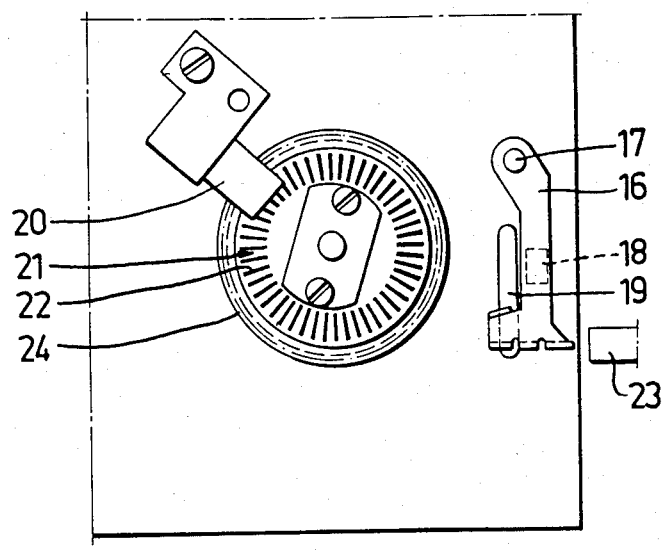
Figure 6:
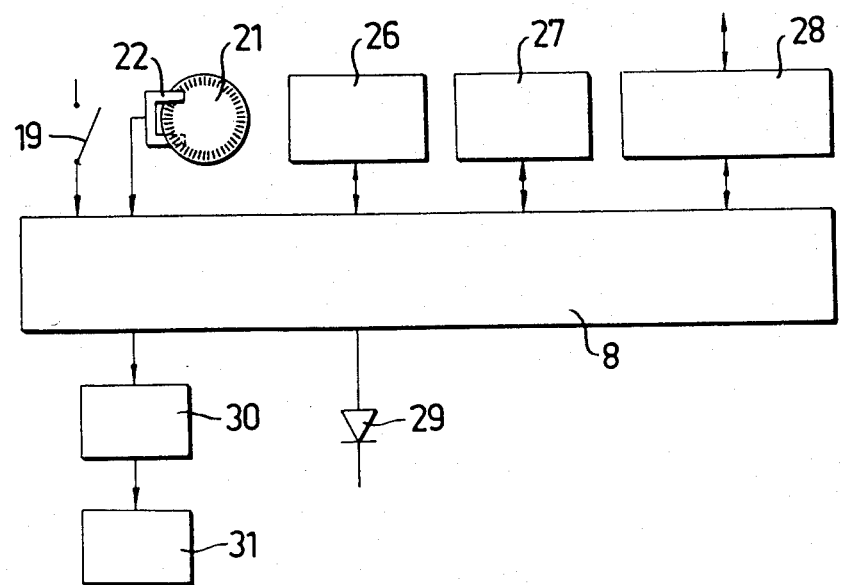

The invention is described in greater detail in the following, with reference to the accompanying claims and drawings, in which FIG. 1 is a schematic perspective view of a film magazine with a device according to the invention mounted thereon, FIG. 2 is a schematic partial section of an embodiment of the invention seen from the film frame side and mounted on the film magazine, FIG. 3 is a schematic lateral sectional view of the device, FIG. 4 is a schematic partial section of a second embodiment of the invention, FIG. 5 shows a control mechanism essential for the invention, FIG. 6 is a schematic block diagram, and FIG. 7 shows a film portion with recorded data.

In FIG. 1 the numeral 1 designates a film magazine, which is intended to be attached with its side 2 on a camera body (dash-dotted). 3 designates the device for the recording of data according to the invention, which device is attached detachably on the top of the film magazine 1.

The data recording device 3 comprises in principle a microprocessor with peripheral equipment such as reprogrammable reading memory (PROM), direct memory (RAM), clock, interface for asynchronous communication (ACIA), drive unit and reserve battery for clock and direct memory. This control electronic equipment is assembled of per se known established components, which within the scope of the art can be completed with or replaced by other components. The device 3 further may be provided with display unit and test button (light emitting diode LED), whereby data put in can simply be controlled. In FIG. 1 a cover 4 for the battery space is shown moved to one side of the device.

On the other side, i.e. the upper right-hand corner of the device according to FIG. 1, see FIG. 2, at one embodiment an LED seven segment character 5 is rigidly attached. At the bottom of the device 3 an opening 6 provided with a lens 6a is located, which opening 6 in mounted state of the data recording device 3 coincides with an opening 7 in the film magazine 1. The numeral 8 designates the microprocessor and memory circuit, and 9 indicates schematically the battery. In the film magazine 1 the guide roller 10a is indicated, over which a film 11 is shown guided. 10b designates film spools. The light-sensitive emulsion side of the film 11, as is easily understood, in FIGS. 2, 3 and 4 is turned outward to the side 2. When segments in the LED character 5 are lighted, the light is reflected via mirrors 12 through the openings 6 and 7 to the light-sensitive emulsion side in the magazine 1. The LED character 5 and the openings 6 and 7, as appears from FIG. 2, are so positioned that the light rays meet the film at its edge, outside the exposed frame, as shown schematically in FIG. 7.

In FIG. 4 a second embodiment of the device according to the invention is shown schematically, where LED 13 are arranged in a row of, for example, seven discrete LED chips. The row of LED 13 is located across the movement direction of the film 11. The LED are connected by conductors to a contact 14 in the film magazine 1. A second contact 15 co-operating with the contact 14 in the device 3 is connected to the microprocessor and memory circuit 8. The row of LED 13 is located at the frame edge of the magazine side 2 and recessed therein, so that the diodes, for example, will be located in alignment with the inside of the frame and thereby adjacent the light-sensitive film side moving past the diodes. The contacts 14 and 15 are arranged so as to automatically be coupled together when the device 3 is being attached on the film magazine 1.

The recording of data on the light-sensitive emulsion side of the film is carried out while the film is being advanced, in such a manner, that segments in the LED character or one or more LED in the row of discrete LED chips are lighted and extinguished in step with the film movement. This lighting and extinguishing of the diodes is controlled by the microprocessor 8 with peripheral equipment by order from a trigger mechanism, which schematically is shown in FIG. 5. When the trigger button of the camera is depressed for exposing a film frame, a signal lever 16 moves via the trigger rod 23 of the camera in the direction to the left (according to FIG. 5) about a pin 17. The signal lever 16 thereby actuates by means of a magnet 18 attached on the lever a reed relay 19, which is closed. Hereby the control electronic unit is activated and actual data, for example time, is stored. A reading fork 20 attached in the magazine is activated simultaneously. When the film after completed exposure is advanced, a code disc 21 is rotated, which is attached on a film division wheel 24 normally comprised in the magazine. The film division wheel 24, and therewith the code disc 21, moves accurately through one revolution per frame and is divided, for example, into fortyeight sections 22. Actual data are hereby fed to the LED character 5 or row of LED 13 in step with the pulses from the reading fork generated by the sections 22. It is to be understood here without saying, that the number of characters desired to be recorded on the film can be chosen at option, whereby the code disc is provided with the corresponding number of sections.

The electronic unit preferably can be subjected to a self-test comprising a.o voltage control and conformability control of the clock, whereby an approved test result causes the test button or LED 26 (FIG. 1) to blink some times. In FIG. 6 a block diagram of the processor unit is shown which is comprised in the data recording device according to the invention. 8 designates, thus, the microprocessor actuated by the frame exposure via the reed relay 19 and code disc 21 with reading fork 22. The real time clock 26 and direct memory (RAM) 27 alternatively are supplied from a reserve battery, which automatically is switched on when the main battery 9 is removed, for example for exchange. 28 designates a series link for communication with the external equipment, and 29 designates the connection to the test button or LED. 30 and 31 designate a drive unit (driver) for, respectively, the LED character 5 and row of discrete LED chips 13.

Via the interface for asynchronous communication (ACIA) of the control electronic unit data can be put in and, respectively, out of the direct memory via an external programming unit, which can be connected to the battery compartment of the device. Basic data such as clock time, date, frame number and the like can also be feedable into the electronic system via a programming unit (not shown) mounted on the device 3 or film magazine 1. It is here to be pointed out, that the electronic components comprised in the processor unit and peripheral equipment and required for generating the light pulses are such, that they do not give rise to problems for the expert.

The LED character 5 or row of LED 13, of course, can be arranged so within the scope of the invention, that they, when desired, record data in a different place on the film, for example on a de-masked strip of the exposed frame.

What we claim is:

1. In a camera including a camera body and a separate film magazine detachably attached to said camera body, the improvement comprising a device for recording data on the emulion side of a film operatively mounted in said film magazine, said device including:
   (a) a housing;
   (b) a microprocessor mounted in said housing and powered by a battery mounted in said housing;
   (c) a character generator mounted in said housing and controlled by said microprocessor to generate preprogrammed character sequences;
   (d) a hole in said housing and optical means for optically conveying said character sequences to said hole;
   (e) said film magazine having a housing on which is detachably mounted said data recorded device;
   (f) said film magazine housing having a hole therethrough adjacent a portion of said emulsion side of said film where it is desired to record said data thereon; and
   (g) said film magazine housing hole being aligned with said data recording device housing hole when said data recording device is mounted on said film magazine housing whereby actuation of said character generator results in characters generated thereby being recorded on said emulsion side of said film adjacent said hole in said film magazine housing.

2. The invention of claim 1, wherein said hole in said film magazine housing directly conveys said characters to said film without any intervening optical structure.

3. The invention of claim 1, wherein said optical means comprises a first mirror adjacent said character generator, a second mirror adjacent said first mirror and a lens adjacent said hole in said device housing hole, said characters reflecting off said mirrors, and being focused by said lens whereupon the focused characters travel directly through said holes and illuminate on said film.

* * * * *